Figure 1:
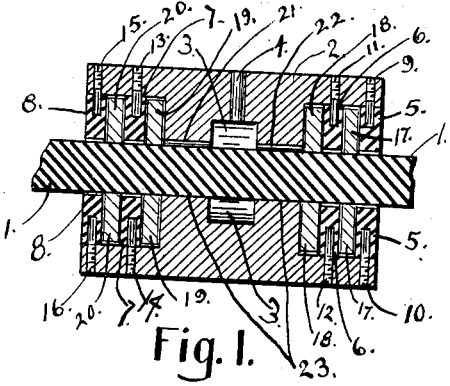

J. E. THEBAUD.
LUBRICANT RETAINER.
APPLICATION FILED MAY 17, 1909.

1,100,001.

Patented June 16, 1914.

WITNESSES:

INVENTOR
John Edward Thebaud

UNITED STATES PATENT OFFICE.

JOHN EDWARD THEBAUD, OF BUFFALO, NEW YORK, ASSIGNOR OF ONE-HALF TO HARRY C. NASH, OF BUFFALO, NEW YORK.

LUBRICANT-RETAINER.

1,100,001. Specification of Letters Patent. Patented June 16, 1914.

Application filed May 17, 1909. Serial No. 496,675.

*To all whom it may concern:*

Be it known that I, JOHN EDWARD THEBAUD, a citizen of the United States, residing at Buffalo, in the county of Erie and State of New York, have invented certain new and useful Improvements in Lubricant-Retainers for Contacting Bodies, One Within the Other, Forming a Bearing. The relation of said improvements to contacting bodies forming a bearing, but one terminating within the other, forms the subject of Letters Patent No. 958,193, issued May 17, 1910. The relation of said improvements to contacting bodies, one within the other, forming a bearing, but not terminating one within the other, forms the subject of this application; and I do hereby declare the following to be a full, clear, and exact description of this improvement, such as will enable others skilled in the art to which it appertains to make and use the same, reference being had to the accompanying drawings, and to figures of reference marked thereon, which form a part of this specification.

The object of that part of my invention which forms the subject of this application is to provide similar means between and at or near each end of the contacting surfaces of said bodies to prevent the escape of the lubricant. To that end, I provide one or more rings or devices placed between the said bodies, at or near each end of the contacting surface of said bearing and having said rings or devices fixed upon the outer of said bodies and forming with said bodies one or more annular spaces between the said bodies, while allowing a free working fit between the said bodies and between the inner of said bodies and said rings or devices. Occupying the said annular space or spaces, I provide one or more rings or devices fixed upon the inner of the said bodies and having a free working fit with the outer of said bodies and said rings or devices thereon; all parts being so arranged that, if the lubricant should pass out between the said bodies and rings or devices at or near each end of the contacting surfaces of said bearing, it would, of necessity, pass around those rings or devices fixed upon the inner of said bodies, first away from, then parallel with, then toward the axis of rotation and then out from between the said bodies; but in a motion of rotation between said bodies, the said lubricant would be prevented from returning toward the axis of rotation by centrifugal action and thus prevent the escape of the lubricant and demonstrating the retaining qualities of my invention.

My invention further consists of certain details of construction, all of which will be hereinafter described and claimed.

Figure 2:
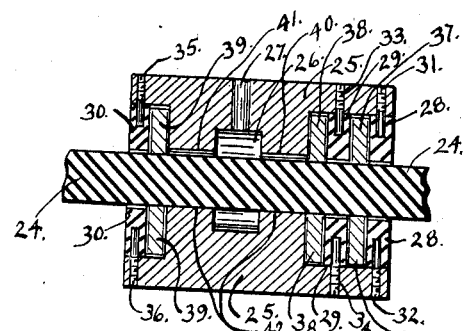
Figure 3:
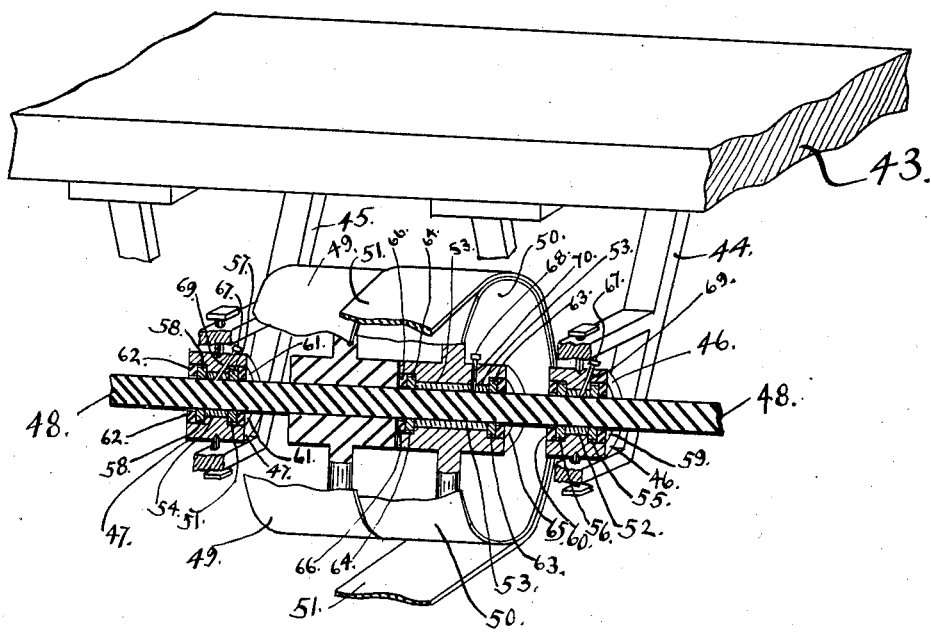

In the drawings, Figure 1 is a longitudinal sectional view of a journal bearing fitted with my invention. Fig. 2 is a longitudinal sectional view of another journal bearing fitted with my invention but having one set of rings or devices, according to my invention, at one end of the contacting surfaces of said bodies forming a bearing, while at the other end I have two sets of rings or devices. Fig. 3 is a perspective and sectional view of a tight and loose pulley on a shaft supported in hangers together with the assembled parts of my improved lubricant retainer.

Referring to the drawings, in Fig. 1, 1 is a shaft or journal free to rotate in the journal bearing or box 2. 3 is a lubricant chamber with the hole 4 leading into it. 5, 6, 7 and 8 are outer rings between the shaft 1 and the box 2, and are secured within the box 2 by the respective pins, 9 and 10, 11 and 12, 13 and 14, 15 and 16. Fixed upon the shaft 1 and occupying the annular spaces formed by the outer rings 5, 6, 7 and 8 with the shaft and the box 2, are the inner rings 17, 18, 19 and 20. Channels 21 and 22 assist in distributing the lubricant over the bearing surface 23.

In the form of my invention, shown in Fig. 2, 24 is a shaft or journal, free to rotate in the journal bearing or box 25. 26 is a lubricant chamber with the hole 27 leading into it. 28, 29 and 30 are outer rings between the shaft 24 and the box 25 and are secured within the box 25 by the respective pins 31 and 32, 33 and 34, 35 and 36. Fixed upon the shaft 24 and occupying the annular spaces formed by the outer rings, 28, 29 and 30 with the shaft 24 and the box 25, are the inner rings 37, 38 and 39. Channels 40 and 41 assist in distributing the lubricant over the bearing surface 42.

In Fig. 3, 43 is a beam from which is suspended the hangers 44 and 45. 46 and 47 are hanger boxes in which is journaled the shaft 48. Mounted upon the shaft 48 are the tight pulley 49 and the loose pulley 50.

51 is a belt upon the loose pulley. 52, 53 and 54 are soft metal bushings. The hanger boxes 46 and 47 are each provided with two sets of rings of which 55, 56, 57 and 58 are the inner rings; 59, 60, 61 and 62 are the outer rings. The loose pulley 50 is provided with inner rings 63 and 64 and outer rings 65 and 66. 67 and 68 are plugs to the lubricant ducts 69 and 70.

In construction, the inner rings 17, 18, 19 and 20 of Fig. 1, 37, 38 and 39 of Fig. 2, and 55, 56, 57, 58, 63 and 64 of Fig. 3, are all made to fit tight upon the respective shafts 1. 24 and 48 are forced thereon into their respective position but have a free working fit with other contacting surfaces. The outer rings 5, 6, 7 and 8 of Fig. 1, 28, 29 and 30 of Fig. 2, and 59, 60, 61, 62, 65 and 66 of Fig. 3, are made to fit tight within the respective box 2, box 25, hanger boxes 46 and 47 and hub of loose pulley 50, and are forced into their respective positions, but have a free working fit with the other contacting surfaces. Screw pins, above referred to, are shown to illustrate one form of further securing the outer rings in the positions where they have been forced.

In operation, a lubricant is fed into a chamber provided for it and finds its way between the contacting bodies through channels provided for its passage. In the rotation of the parts, the lubricant tends to fly off the inner rings and centrifugal action prevents it from backing toward the axis of rotation along the passage out, between the contacting surfaces. In connection with lubricant circulating devices, my invention will prevent flooding at the bearings, to which it is applicable.

In Fig. 1, rings or devices 5 and 17 may be considered as constituting one set, while 6 and 18 constitute another set, at or near one end of the contacting surfaces of the bearing, while at or near the other end of the bearing, two similar sets of rings or devices 19 and 7, 20 and 8, are shown. In Fig. 2, two sets of rings or devices are shown at or near one end and one set is shown at or near the other of the said bearing. Additional sets of rings or devices similar in purpose and form to those referred to in the figures may be provided between the contacting bodies forming the bearing.

The details of construction of the devices shown in the drawings and described in the above specification may be changed and yet such modified devices may still come within the scope of my invention. Therefore, I do not wish to be confined to the special application of this lubricant retainer shown in the drawings and described in this specification.

Hence I claim:

1. A device adapted to retain oil on a bearing comprising two members journaled together, one of said members being circular in section and positioned through the outer member, said outer member having one or more annular recesses near each end thereof adjacent to the other member, a collar positioned upon the inner member within each of said recesses, the walls of said recesses being lubricant tight and closely enveloping said collars, whereby a lubricant extends from between the bearing surfaces of said members to envelop and contact said collars as a lubricant film, while contacting the inner walls of said recesses, means for supplying the lubricant to the device, one of said members and said collars coöperating with the other of said members to neutralize by centrifugal action the outward movement of the lubricant from between the members, by maintaining the said lubricant film at each of said collars, substantially as set forth.

2. In a device of the character described, a bearing provided with an axial bore with chambers at each end of the bearing concentric with the bore, a shaft rotatably mounted within the bore, spaced rings secured to the bearing and disposed within the chambers at each end thereof, said rings forming annular recesses with the bearing and with each other, spaced collars rigidly secured to the shaft for rotation therewith and disposed within the recesses, a lubricant reservoir disposed intermediate the chambers of the bearing and having conduits for supplying oil to the recesses inclosing said collars, the walls of said recesses being lubricant tight whereby the lubricant extends from between the bearing surfaces of the shaft and the bearing to envelop and contact with the collars and rings as a lubricant film while contacting with the inner walls of said recesses, the lubricant film on opposite sides of each collar being neutralized by centrifugal action to prevent outward movement of the lubricant from between the shaft and its bearing.

JOHN EDWARD THEBAUD.

Witnesses:
Wm. J. Bodman,
Frank A. Embry.

Copies of this patent may be obtained for five cents each, by addressing the "Commissioner of Patents, Washington, D. C."